United States Patent
Evangelisti et al.

(10) Patent No.: US 12,451,823 B2
(45) Date of Patent: Oct. 21, 2025

(54) CONTROL METHOD AND CIRCUIT FOR A DIRECT CURRENT MOTOR FOR AN INFUSION UNIT OF A MACHINE FOR PREPARING COFFEE BEVERAGES

(71) Applicant: DE'LONGHI APPLIANCES S.R.L. CON UNICO SOCIO, Treviso (IT)

(72) Inventors: Paolo Evangelisti, Treviso (IT); Alberto Acciari, Treviso (IT); Davide Bonotto, Treviso (IT)

(73) Assignee: DE'LONGHI APPLIANCES S.R.L. CON UNICO SOCIO, Treviso (IT)

( * ) Notice: Subject to any disclaimer, the term of this patent is extended or adjusted under 35 U.S.C. 154(b) by 361 days.

(21) Appl. No.: 18/014,415

(22) PCT Filed: Jul. 8, 2021

(86) PCT No.: PCT/IT2021/050213
§ 371 (c)(1),
(2) Date: Jan. 4, 2023

(87) PCT Pub. No.: WO2022/009246
PCT Pub. Date: Jan. 13, 2022

(65) Prior Publication Data
US 2023/0268853 A1    Aug. 24, 2023

(30) Foreign Application Priority Data
Jul. 9, 2020   (IT) .................... 102020000016672

(51) Int. Cl.
G05B 11/01    (2006.01)
H02K 11/215   (2016.01)
(Continued)

(52) U.S. Cl.
CPC .............. *H02P 6/16* (2013.01); *H02K 11/215* (2016.01); *A47J 31/36* (2013.01)

(58) Field of Classification Search
CPC ................................ H02P 6/16; H02K 11/215
(Continued)

(56) References Cited

U.S. PATENT DOCUMENTS 4,266,177 A * 5/1981 Nola .................... H02J 3/1892
 327/452
4,716,409 A * 12/1987 Hart .................... G05B 19/042
 340/12.31

(Continued)

FOREIGN PATENT DOCUMENTS

EP    2 983 288 A1    2/2016

OTHER PUBLICATIONS

International Search Report and Written Opinion issued Oct. 15, 2021 in PCT/IT2021/050213.
(Continued)

*Primary Examiner* — Erick D Glass
(74) *Attorney, Agent, or Firm* — Panitch Schwarze Belisario & Nadel LLP

(57) ABSTRACT

Embodiments described here concern a method to control a direct current motor powered by an alternating supply voltage, which provides to detect the instant of the zero-crossing of the supply voltage and to selectively activate a switch device to power the motor by the positive half-waves of the supply voltage in order to make it rotate in one sense, and by the negative half-waves in order to make it rotate in the opposite sense. The disclosure also concerns a control circuit for the motor.

12 Claims, 3 Drawing Sheets

(51) Int. Cl.
    *H02P 6/16*    (2016.01)
    *A47J 31/36*   (2006.01)
(58) Field of Classification Search
    USPC .......................... 318/635, 139, 280, 281, 284
    See application file for complete search history.

(56) References Cited

U.S. PATENT DOCUMENTS

| | | | | |
|---|---|---|---|---|
| 5,592,058 | A * | 1/1997 | Archer | F24F 11/52 |
| | | | | 318/400.11 |
| 9,441,869 | B2 * | 9/2016 | Stagg | F25C 1/24 |
| 10,006,687 | B2 * | 6/2018 | Stagg | F25C 1/04 |
| 2007/0093928 | A1 * | 4/2007 | Forster | H02M 5/2576 |
| | | | | 700/168 |
| 2018/0014685 | A1 | 1/2018 | De'Longhi et al. | |

OTHER PUBLICATIONS

"Inductive Load Control with AC Switches", ST Microelectronics, pp. 1-16, (Mar. 2010).

* cited by examiner

CONTROL METHOD AND CIRCUIT FOR A DIRECT CURRENT MOTOR FOR AN INFUSION UNIT OF A MACHINE FOR PREPARING COFFEE BEVERAGES

CROSS-REFERENCE TO RELATED APPLICATIONS

This application is a Section 371 of International Application No PCT/IT2021/050213, filed Jul. 8, 2021, which was published in the English language on Jan. 13, 2022, under International Publication No. WO 2022/009246 A1, which claims priority under 35 U.S.C. § 119 (b) to Italian Application No. 102020000016672, filed Jul. 9, 2020, the disclosures of each of which are incorporated herein by reference.

FIELD OF THE INVENTION

The present invention concerns a control method and corresponding circuit for direct current motors.

Advantageously, but not exclusively, the method and the circuit can be used to control direct current motors in applications which require frequent inversions of the direction of rotation of the motor, and limited costs.

In particular, the control method and circuit can be used to control direct current motors in automation applications for moving a robotic arm, or also in household appliances, such as for moving the infusion unit of automatic coffee machines, or the blade of an ice cream machine, or the rack of a washing machine, or in the automotive sector or also in the consumer sector or in similar applications.

BACKGROUND OF THE INVENTION

It is known that very often, in applications where direct current motors are used, there is a need for systems to control the motor that are simple, but at the same time reliable.

Direct current motors can be controlled in various ways. The traditional solution provides to obtain a direct current voltage, around the nominal voltage of the motor. Using motors with a nominal voltage of 230 Vdc it is possible to power them with the rectified mains voltage. If the direction of rotation is to be controlled, a control circuit called "H bridge" is normally used, which can be made with two relays in exchange, or in solid state.

Traditional systems have some disadvantages. A first disadvantage is the fact that they require the presence of a direct current power supply, or at least a rectifier bridge. It is also necessary to provide a mains filter to eliminate possible disturbances.

Furthermore, in the event that the motors are subject to frequent variations in the direction of rotation, and therefore to cyclically repeated loads, breakages and malfunctions of the components of the H bridge circuit may occur, in particular if mechanical or electromechanical components are used, such as for example reed-relays.

The use of thyristors is also known, for example SCR (Silicon Controlled Rectifiers), TRIAC (Triodes for Alternating Current), bi-directional switch diodes, controlled silicon switches and suchlike, to control direct current motors.

In fact, motor power supply circuits can be used that provide one or more thyristors, in which the load is attached to the alternating power supply in the positive or negative half-cycle, depending on the direction of rotation required.

One disadvantage of known solutions, particularly felt in applications in which frequent switching cycles are present, in particular if associated with not inconsiderable frequencies and powers, is the onset of phenomena of electromagnetic interference. In fact, during switching, the almost instantaneous variation in the voltage and current values can lead to the generation of current peaks, known in the field as spikes or bursts or suchlike, which can generate high frequency interfering disturbance signals. These signals can disturb other electronic systems of the motor itself, or of other devices, or electronic apparatuses located nearby.

In particular, since a direct current motor can be considered an ohmic-inductive type load, the current applied has a phase delay with respect to the voltage. At the heads of the motors controlled by thyristors, driven by the positive half-wave only, the current can therefore have a peak of negative value at the instant of switching. In a dual manner, if the motor is driven by the negative half-wave, the current peak is positive. This current peak, from an electromagnetic point of view, can be considered as a source of disturbance of the spike type.

Since the presence of current spikes can cause dangers for a user and generate problems on the electric power supply network, electronic devices and apparatuses must have suitable electromagnetic compatibility (EMC) characteristics, for example described in dedicated technical standards and/or required to obtain marking and marks such as the CE marking or the TUV mark.

To allow the use of direct current motors, generally less expensive than alternating current motors, known solutions therefore require the use of filters and circuits to limit the current, which however entail additional costs.

Document EP 2 983 288 A describes a circuit to drive an electric motor connected in series to an alternating current power source, which comprises a controllable bidirectional switch, a position sensor which is configured to detect the position of a rotor of the motor and a circuit to control the switch that commands the bidirectional switch as a function of the detected position of the rotor.

The disadvantages connected to current spikes and increased costs are particularly evident in the case of small household appliances, where an optimization of the spaces is also required, as well as the cost of components, and in particular in machines for preparing coffee beverages, in which it is necessary to continuously invert the direction of movement of the infusion unit.

There is therefore a need to perfect a control method and circuit for direct current motors which can overcome at least one of the disadvantages of the state of the art.

In particular, one purpose of the present invention is to perfect a control method and circuit for a direct current motor for an infusion unit of a machine for preparing coffee beverages which does not have any problems in terms of electromagnetic compatibility.

Another purpose of the present invention is to provide a control circuit for a direct current motor which is simple, reliable and has a long useful life.

Another purpose is that said control circuit maintains a limited cost, which does not preclude its use in applications characterized by high numbers of electronic and/or electromechanical devices or low final price to the user, such as for example applications of the automotive or consumer type, or in small appliances such as machines for preparing coffee beverages.

Another purpose is to perfect a control method and circuit for a motor which allow to control the motor in a precise manner, and to carry out precise positioning by means of said motor, thus reducing noise and/or mechanical vibrations to a minimum.

The Applicant has devised, tested and embodied the present invention to overcome the shortcomings of the state of the art and to obtain these and other purposes and advantages.

SUMMARY OF THE INVENTION

The present invention is set forth and characterized in the independent claims. The dependent claims describe other characteristics of the present invention or variants to the main inventive idea.

In accordance with the above purposes, embodiments described here concern a control method and circuit for direct current motors, which overcome the limits of the state of the art and eliminate the defects present therein.

Advantageously, the control method and circuit as above can be applied to direct current motors which, during use, are subject to frequent variations in the sense of rotation, and are for example used to move an element connected to them forwards and backwards along a pre-defined path, or also to alternately rotate it clockwise or counterclockwise.

The invention can be advantageously used in particular to move an infusion unit of a machine for preparing coffee beverages.

In accordance with some embodiments, the control method according to the invention provides to selectively power the motor with the negative half-waves, or the positive half-waves, of an alternating supply voltage, in order to make it rotate in one sense or the other.

Advantageously, the method allows to power the motor directly with the alternating voltage supplied by a power supply grid, for example having a voltage value equal to 230Vdc and a frequency of 50 Hz, or 60 Hz.

According to the invention, the control method to power the motor with the desired half-wave provides to detect the instant of the zero-crossing of the supply voltage, and selectively activate a switch device disposed between the motor and the power supply grid with a determinate delay time. In the present description, the zero-crossing is understood in a known way as the instant in which the alternating voltage assumes a value of zero.

According to one aspect of the invention, the method provides to determine the phase delay that exists between the supply voltage and the supply current due to the load, that is, to the motor, and to delay the switching on of the switch device by a delay time correlated to the phase delay determined.

In this way, the commutation of the current on the motor occurs near the zero value, and in any case in the half-wave corresponding to the desired sense of rotation.

As a consequence, the occurrence of an instantaneous variation, with a polarity opposite to the desired one, of the current value at output from the switch device toward the motor is eliminated, consequently eliminating, or at least considerably reducing, the occurrence of electromagnetic disturbances.

According to some embodiments, the method also provides to determine in which direction the motor has to be rotated, detect the zero-crossing of the supply voltage correlated to the sense of rotation determined, and send the command of activation of the switch device after the delay time determined with respect to the half-wave considered.

According to some embodiments, the method provides to detect the rotation speed of the motor and to vary the delay time between the instant of the zero-crossing and the sending of the activation command in relation to the rotation speed detected.

In particular, the delay time can be varied proportionally to the rotation speed, and therefore inversely proportionally to the required torque.

This allows to adequately compensate for the phase shift between the supply voltage and current in each functioning mode.

When the speed of the motor is minimum, in fact, for example when it is switched on, or in correspondence with an end of travel position of a mobile member associated with it, when the required torque is greater, the motor behaves like a substantially resistive load, while as the rotation speed increases, it behaves like an ohmic-inductive load, so that during its functioning the phase shift between voltage and current can vary between a minimum value near zero and a maximum value.

According to some embodiments, the method provides to determine the sense of rotation, and therefore the half-waves to consider, and the delay time for the activation of the switch device on the basis of a mathematical model of the motor and/or of its functioning mode, correlated to a trajectory or to an operating mode of a mobile member associated with it.

According to some embodiments, the method provides to store in a memory unit a mapping of the sense of rotation of the motor and of the rotation speed that it has to assume as a function of the operating mode that the mobile member is in.

If it is provided that the motor continues to rotate in a same sense, the method provides to keep the switch device off when a subsequent instant of zero-crossing of the supply voltage is detected, in the opposite direction, and to switch it on at the next instant, and so on in an alternate manner.

During the time interval in which the switch device is off, and therefore does not allow the motor to be powered from the grid, the motor can continue its rotation due to mechanical inertia.

Furthermore, thanks to the effect given by the combination of the inertia of the motor and the electricity in it, the electric voltage on the motor remains substantially stable even in the half-wave in which the motor is not powered.

Advantageously, the functioning can therefore be considered continuous and free from perceptible fluctuations, even without using additional electronic devices, such as filters.

According to other embodiments, the method can provide, when an end of travel position of a determinate trajectory is reached, to feed to the motor some half-waves of opposite sign to those previously supplied, so as to recover possible mechanical clearances and orient it in the correct sense for the subsequent movement.

According to some embodiments, the method provides to verify the position of the mobile member associated with the motor, in particular the infusion unit, to determine the operating mode with which to command the latter.

In particular, in the case of application to an infusion unit of a machine for preparing coffee beverages, the method provides to determine the sense of rotation as a function of the trajectory of a mobile piston of the infusion unit defining the infusion chamber.

The end of travel positions can correspond, for example, to one or more of either the position for loading the coffee powder, the position for closing the infusion chamber to extract a coffee beverage, or the discharging position in which the exhausted powder is removed from the infusion chamber.

According to the invention, the control circuit for direct current motors comprises a switch device and a device for detecting the zero-crossing of the supply voltage.

According to some embodiments, the control circuit also comprises a control and command unit configured to selectively command the activation of the switch device.

In particular, the control and command unit is configured to receive from the detection device the indication of the zero-crossing of the supply voltage and to activate the switch device after a determinate delay time with respect to the zero-crossing of the supply voltage, in such a way as to obtain a commutation of the switch device in the proximity of the zero-crossing of the current in the motor.

According to some embodiments, the control and command unit can be configured to calculate the delay time to be used by means of a calculation algorithm, based on data stored in a memory unit.

According to some embodiments, the data stored in the memory unit can comprise information relating to the motor and possibly a modeling thereof in terms of ohmic-inductive load, and the control and command unit can be configured to calculate the delay time on the basis of the phase difference that occurs between the supply voltage and the supply current.

According to other embodiments, the data stored in the memory unit can comprise information relating to the direction of rotation or advance of a mobile member associated with the motor, or of a trajectory associated with an operating mode, and the control and command unit can be configured to determine on each occasion the type of half-wave to be supplied to the motor and the delay time on the basis of this information.

According to some embodiments, the control circuit comprises a device for detecting the rotation speed of the motor, and the control and command unit is configured to determine the delay time in which to activate the switch device as a function of the speed detected.

According to some embodiments, the switch device can comprise one or more thyristors. For example, the switch device can comprise a TRIAC thyristor, which is able to allow the delivery of the supply current to the motor, in a controlled manner, both for the negative and also the positive half-waves.

According to one possible solution, the switch device can comprise two SCR (Silicon Controlled Rectifier) thyristors, or two controlled diodes, disposed anti-parallel.

It is therefore possible to power the motor directly through the mains voltage and control its sense of rotation without resorting to further complex and/or expensive circuits, comprising for example direct current power supplies, or power bridges, for example H bridges.

Advantageously, the use of solid-state components such as TRIAC or SCR increases the useful life cycle of the control circuit, since they do not present the problems related to fatigue wear typical of electromechanical components such as relays or other electromechanical switches.

It is also possible, in this way, to increase the positioning accuracy of the elements moved by the motor, in particular the infusion unit, and to reduce noises and vibrations, since it is possible to recover mechanical clearances by means of an inversion of the sense of rotation and therefore a fine-tuning around the positioning point. In fact, based on what stated above, this fine-tuning around the positioning point advantageously does not cause a decrease in the useful life of the control circuit caused by mechanical fatigue.

Another advantage is an increase in the useful life of the apparatus to which the motor and the corresponding control circuit are applied, thanks to the reduction of vibrations.

Another advantage is the greater level of comfort for a possible operator or user of the apparatus, who is subjected to fewer vibrations and/or noises during its use.

Another advantage of the control circuit according to the invention is the extremely limited number of components, which make it economical and therefore able to be used for a plurality of applications.

Oher embodiments described here concern a machine for preparing coffee beverages comprising an infusion unit provided with an infusion chamber, a direct current motor connected to the infusion unit and a control circuit for the motor, wherein the control circuit comprises:
- a power supply circuit that connects the motor to an electric power supply grid configured to supply an alternating supply voltage;
- a device for detecting the instant of the zero-crossing of the supply voltage of the electricity grid;
- a switch device connected between the electric power supply grid and the motor, which can be selectively activated to allow or prevent the passage of an electric current between the electric power supply grid and the motor;
- and a control and command unit configured to selectively activate the switch device to power the motor by means of the positive half-waves of the supply voltage to rotate it in one sense, and by means of the negative half-waves to rotate it in the opposite sense.

According to one aspect of the present invention, the control and command unit is configured to receive a detection signal of the instant of the zero-crossing of the supply voltage and to supply an activation command signal for the switch device with a delay time with respect to the crossing instant detected, in such a way that the switch device enters into conduction when the value of the current applied to the motor is near zero.

According to some embodiments, the machine also comprises a memory unit in which the trajectory followed by the infusion unit is mapped, starting from an initial position, at least during a step of ascent to close the infusion chamber, during an infusion step, and during a subsequent step of opening the infusion chamber and discharging the exhausted powder, and return to the initial position, and for each position/trajectory there is associated a determinate sense of rotation, and a determinate rotation speed or torque required for the motor. Advantageously, the control and command unit can be configured to command the switch device on the basis of the data stored in the memory unit and on the basis of a beverage preparation command received by means of a user interface.

Other embodiments described here concern a method to move a mobile infusion unit of a machine for preparing coffee beverages provided with an infusion chamber according to a predefined trajectory from at least one initial position to at least one position for closing the chamber and at least one position for discharging the exhausted coffee powder, wherein the infusion unit comprises a direct current motor powered by an alternating supply voltage. The method provides to detect the instant of the zero-crossing of the supply voltage and selectively activate a switch device to power the motor by means of the positive half-waves of the supply voltage in order to make it rotate in one sense between the initial position and at least the closing position, and by means of the negative half-waves in order to make it rotate in the opposite sense from the closing position at least toward the discharging position.

According to one aspect of the present invention, the method provides to activate the switch device with a determinate delay time with respect to the instant of the zero-crossing of the supply voltage so that the switch device enters into conduction at the moment in which the value of the current that powers the motor is near zero.

BRIEF DESCRIPTION OF THE DRAWINGS

These and other aspects, characteristics and advantages of the present invention will become apparent from the following description of some embodiments, given as a non-restrictive example with reference to the attached drawings wherein.

Figure 1:
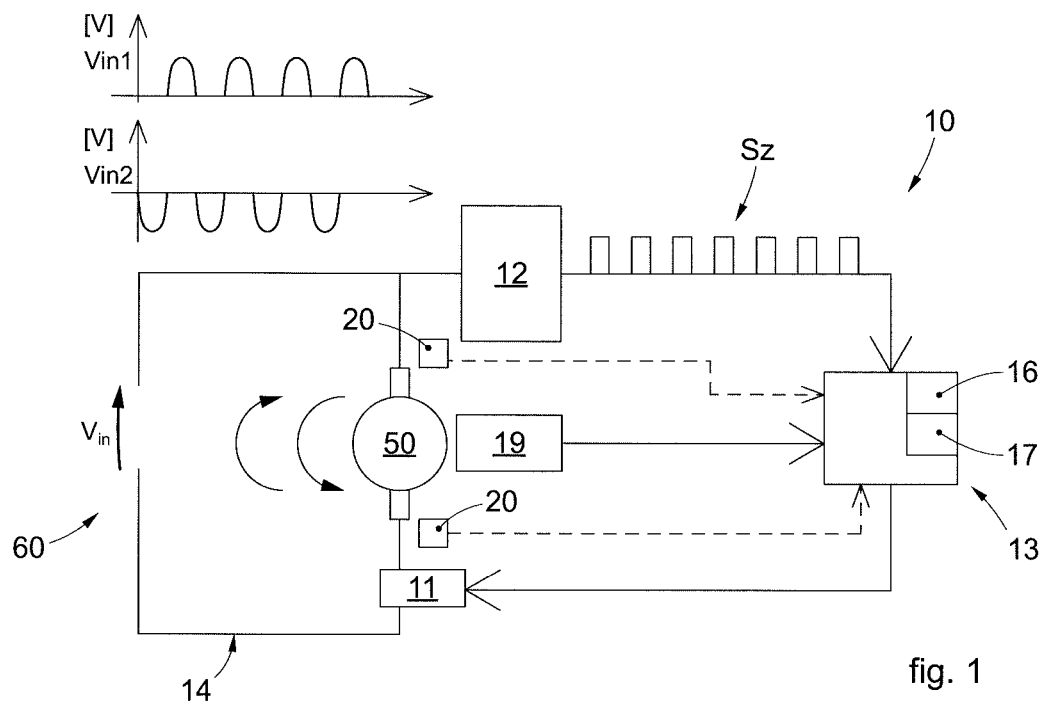
FIG. 1 is a schematic block diagram of the control circuit of a motor and of supply voltages and control signals according to some embodiments.

To facilitate comprehension, the same reference numbers have been used, where possible, to identify identical common elements in the drawings. It is understood that elements and characteristics of one embodiment can conveniently be combined or incorporated into other embodiments without further clarifications.

DETAILED DESCRIPTION OF SOME EMBODIMENTS

We will now refer in detail to the possible embodiments of the invention, of which one or more examples are shown in the attached drawings, by way of a non-limiting illustration. The phraseology and terminology used here is also for the purposes of providing non-limiting examples.

Figure 3:
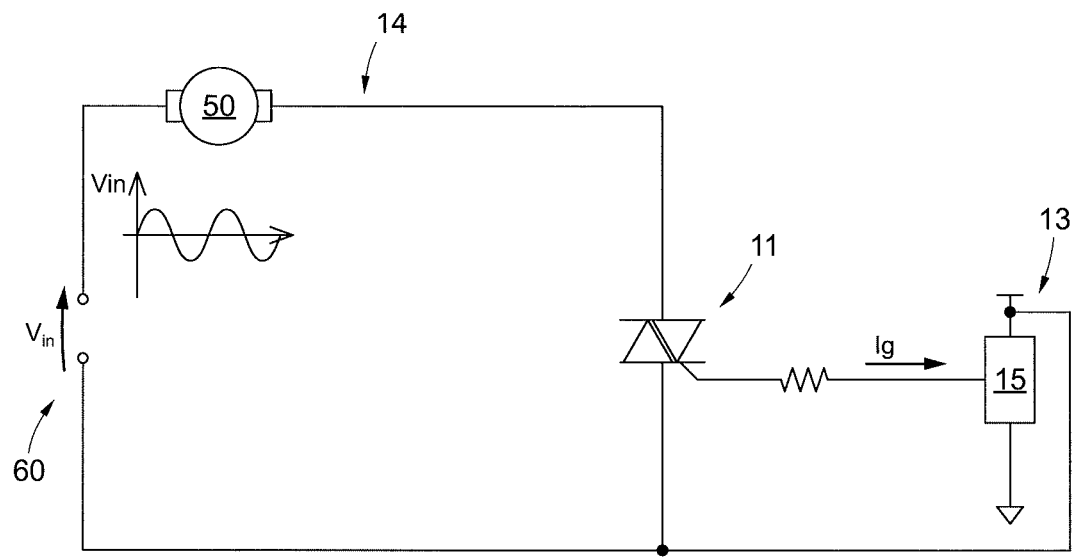
FIG. 3 is a schematic representation of a detail of the control circuit of FIG. 1.

With reference to FIGS. 1 and 3 attached, a control circuit 10 for a direct current motor 50 is described which allows to overcome the limits of the state of the art and eliminate the defects present therein.

The motor 50 and the control circuit 10 can be advantageously used in a machine 70 for preparing coffee beverages, and preferably applied to an infusion unit 71 thereof, which is provided with a piston 72 defining an infusion chamber 73 and is mobile between at least a first position for loading the coffee powder into the chamber 73, a second position for infusing the coffee powder and a third position for discharging the exhausted coffee powder.

The motor 50 is connected to a power supply grid 60 suitable to supply an alternating current supply voltage Vin and the control circuit 10 is configured to selectively supply to the motor 50 the positive half-waves Vin1 or the negative half-waves Vin2 of the supply voltage in order to determine the consequent rotation of the motor 50 in a first sense or in a second sense, opposite the first.

Figure 2A:
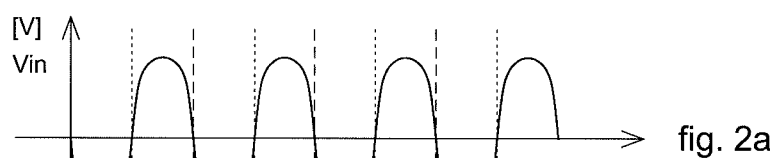
FIGS. 2a and 2b respectively show the alternating supply voltage and a corresponding signal indicating the zero-crossing.
Figure 2B:
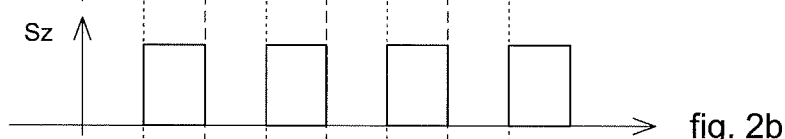
Figure 2C:
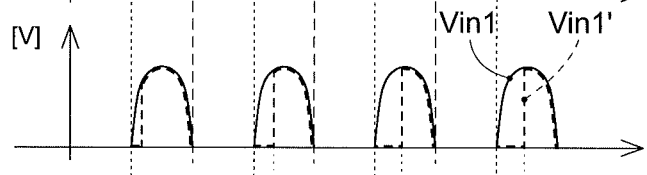
FIGS. 2c-2d show the trend over time of the supply voltages and the control signal of a switch which are supplied to a motor in order to rotate it in a counterclockwise sense of rotation.
Figure 2D:
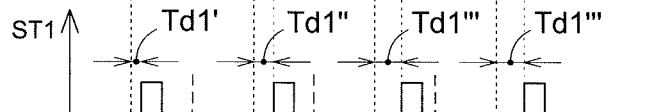
Figure 2F:
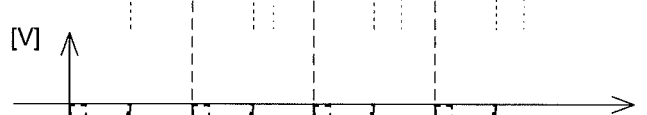
FIGS. 2f-2g show the trend over time of the supply voltages and the control signal of a switch which are supplied to a motor in order to rotate it in a clockwise sense of rotation.
Figure 2G:
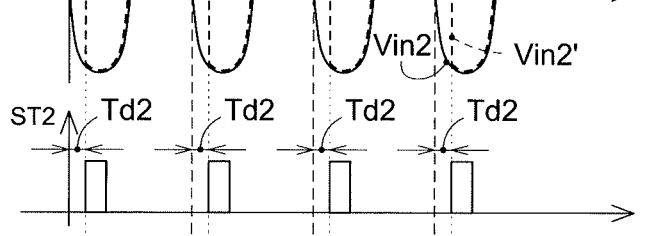
Figure 2E:
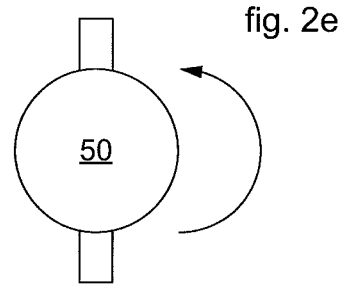
FIG. 2e is a representation of a counterclockwise sense of rotation of the motor for the supply voltage and the control signals of FIGS. 2c and 2d.
Figure 2H:
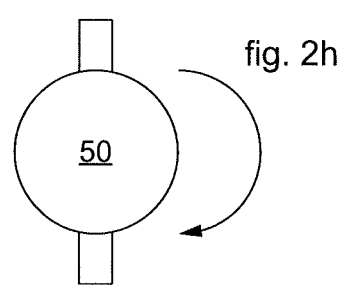
FIG. 2h is a representation of a clockwise sense of rotation of the motor for the supply voltage and the control signals of FIGS. 2f and 2g.

For example, it can be provided that, when the positive half-waves are supplied to the motor 50, it rotates counterclockwise (FIGS. 2c-2e), while if the negative half-waves are supplied to it, it rotates clockwise (FIGS. 2f-2h).

According to some embodiments, the motor 50 can be a permanent magnet motor.

Figure 6:
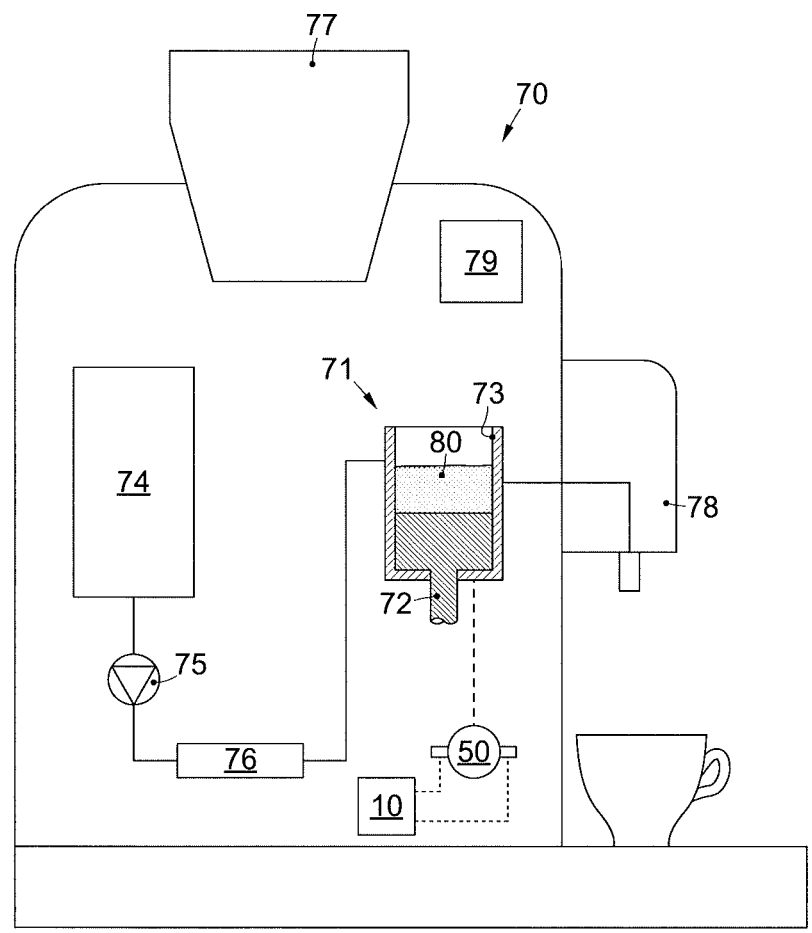
FIG. 6 is a schematic representation of a machine for preparing coffee beverages comprising the control circuit of FIG. 1 applied to the motor of a mobile infusion unit.

According to some embodiments, the motor 50 can be connected to a mobile element or member, for example a piston 72 of the infusion unit 71 shown in FIG. 6, in order to rotate or move it appropriately. The mobile member can be connected directly to a shaft of the motor 50 in order to be rotated integrally therewith, or it can be connected to the motor 50 by means of a rack-and-pinion system, or suchlike, in order to be translated forward and backward in a determinate direction.

According to one aspect of the invention, the circuit 10 comprises a switch device 11 connected between the power supply grid 60 and the motor 50, which can be selectively activated to allow or prevent the passage of an electric current between the power supply grid 60 and the motor 50.

The switch device 11 can comprise one or more thyristors, for example SCR, TRIAC, bi-directional switching diodes, silicon-controlled switches and suchlike, for controlling direct current motors.

As a preferential example, the switch device 11 is a single TRIAC. As another example, the switch device 11 can comprise two SCRs connected anti-parallel to each other.

The switch device 11 can be connected in series with the motor 50 in a power supply circuit 14, and ideally behave as an open circuit, when switched off, and as a closed circuit, when switched on.

The circuit 10 also comprises a detection device 12 configured to detect when the alternating supply voltage crosses the zero and changes sign, and to supply a correlated electrical detection signal Sz at the instant in which the supply voltage Vin assumes a value of zero (zero-crossing).

According to some embodiments, the circuit 10 comprises a control and command unit 13 configured to selectively command the activation of the switch device 11.

According to some embodiments, the control and command unit 13 can be able to interface with the zero-crossing detection device 12 in order to receive the detection signal Sz. In this way, the control and command unit 13 can be synchronized with the mains supply voltage Vin.

The detection device 12 can also be able to communicate to the control and command unit 13 the sign of the half-wave, positive Vin1 or negative Vin2, of the supply voltage Vin.

According to some embodiments, the detection device 12 can be configured to supply a pulse or square wave detection signal Sz which has, for example, a rising edge corresponding to the instant of commutation of the supply voltage Vin from negative values to positive values and a falling edge corresponding to the commutation from positive values to negative values.

According to some embodiments, the detection device 12 can be an analog or digital comparator, a zero detector or suchlike.

According to some embodiments, the control circuit 10 can also comprise an analog-to-digital converter, not shown in the drawings, for adapting the analog signal in correspondence with the supply voltage Vin to the digital signal at input to the comparator or to the control and command unit 13.

The control and command unit 13 can be a microcontroller, a microprocessor, an analog and/or digital control circuit, an ASIC (Application Specific Integrated Circuit) or suchlike. Preferably, the control device is a microcontroller.

According to the invention, the control and command unit 13 is configured to command the activation of the switch device 11 after a delay time Td from the instant of the zero-crossing, so that the switch device 11 enters into conduction when the current applied to the motor 50 is zero, or in any case near zero.

The switch device 11 can be configured to enter into conduction following the application of a command signal ST1 (FIG. 2d) supplied by the control and command unit 13, powering the motor 50 with the positive half-wave Vin1 (FIG. 2c) of the supply voltage Vin (FIG. 2a), or following the application of a command signal ST2 (FIG. 2g), powering the motor 50 by means of the negative half-wave Vin2 (FIG. 2f). FIGS. 2c and 2f highlight the trend of the voltages actually transferred to the motor Vin1' and Vin2', corresponding to the voltage values between the moment of activation of the switch device 11 and the end of the corresponding positive half-wave Vin1, or negative half-wave Vin2.

According to some embodiments, the command signals ST1 and ST2 can be delayed by a respective time Td1, Td2 with respect to the zero-crossing of the respective positive or negative half-wave, which can be the same or different from each other. For example, if the current spike that occurs is different in the two cases, due to an asymmetry of the devices or other, the respective command signals ST1 and ST2 may be delayed by different times Td1, Td2.

The delay times Td1 and Td2 can also be different as a function of the sense of rotation or the trajectory followed by the mobile member associated with the motor 50.

According to some embodiments, the control and command unit 13 can activate the switch device 11 in such a way that it goes into conduction at the instant of commutation of the current on the motor Im from a negative value to a positive value, or, respectively, from a positive value to a negative value.

The control circuit 10 can comprise a command element 15, able to receive a command signal from the control and command unit 13 and consequently activate the switch device 11.

For example, if the switch device 11 is a TRIAC, the control and command unit 13 can supply a command current signal Ig to the gate of the TRIAC, by means of the command element 15.

After activation, the TRIAC therefore remains in conduction for the remaining duration of the respective current half-wave, and is subsequently deactivated.

The control and command unit 13 can also verify whether, at the end of the switching on time of the switch device 11, it is necessary to further command the rotation of the motor 50 in the same sense. If this is the case, the control and command unit 13 will supply an activation command for the switch device 11 with the desired delay time when the zero-crossing of the voltage in the respective positive half-wave Vin1 or negative half-wave Vin2 is detected.

The control and command unit 13 can also verify whether to stop the motor 50, interrupting its power supply, not sending any activation command to the switch device 11 for a determinate time interval.

The control and command unit 13 can also verify whether to command the rotation of the motor 50 in the opposite sense, supplying an activation command to the switch device 11 in correspondence with the half-wave of opposite sign Vin2 or Vin1.

According to some embodiments, the control circuit 10 can comprise a rotation sensor 19 configured to detect the rotation speed of the motor 50 and communicate the data detected to the control and command unit 13.

The rotation sensor 19 can be a differential or absolute encoder, an inductive speed sensor, a Hall sensor or suchlike.

According to some embodiments, the control and command unit 13 can be configured to determine the delay time Td to be considered as a function of the rotation speed detected.

According to other embodiments, the control and command unit 13 is configured to determine the sense of rotation to be imparted to the motor 50 and the delay time Td for the activation of the switch device 11 on the basis of data stored in a memory unit 16.

Thanks to the data present in the memory unit 16, the control and command unit 13 can in fact directly command the switch device 11 without needing to continuously verify the position of the mobile member, in particular of the infusion unit 71 connected to the motor 50.

Advantageously, the control and command unit 13 can be configured to command the switch device 11 on the basis of the data stored in the memory unit 16 and on the basis of a beverage preparation command received by means of a user interface 74 of the machine 70.

According to some embodiments, the data stored in the memory unit 16 can comprise information relating to the characteristics of the motor 50, or an application thereof, and possibly a modeling thereof in terms of ohmic-inductive load, and the control and command unit 13 can be configured to calculate the delay time Td on the basis of the phase difference that occurs between the supply voltage and the supply current in relation to the type of motor 50 and/or the application.

According to other embodiments, the data stored in the memory unit 16 can comprise information relating to the direction of rotation or advance of an element associated with the motor 50, which has to be rotated and/or moved by the latter, and the control and command unit 13 can be configured to determine on each occasion the type of half-wave to be supplied to the motor and possibly also the delay time Td, as a function of this information.

According to some embodiments, the control and command unit 13 is configured to calculate the delay time Td as a function of the position of the mobile member associated with the motor, or of the functioning mode required on each occasion.

For example, in the case of a direct current motor 50 used to move the piston 72 and/or the infusion unit 71 of a machine 70 for preparing coffee, the trajectory followed by the piston during the step of ascent to close the infusion chamber, during the infusion step, and during the subsequent step of opening the infusion chamber and discharging the exhausted powder, and returning to the initial position, can be mapped in the memory unit 16, and for each position/trajectory there can be provided a determinate sense of rotation, and possibly a determinate rotation speed, or required torque.

In the case of a motor 50 used to mix a liquid or semi-liquid product in a clockwise or counterclockwise sense, respective time intervals correlated to a rotation in one sense or the other, and possibly a determinate rotation speed required can be stored in the memory unit 16.

The control and command unit 13 can comprise a processing unit 17 able to execute a calculation algorithm for calculating the delay time Td on the basis of the data detected by the rotation sensor 19 and of the data stored in the memory unit 16. The processing unit 17 can be integrated in the control and command unit 13.

The memory unit 16 can comprise one or more of either random access memories (RAM) or non-volatile memories such as ROM (Read Only Memory), EPROM (Erasable Programmable Read-Only Memory), EEPROM (Electrically Erasable Programmable Read-Only Memory), rotating medium memories (hard disk) or suchlike.

According to possible variants, the rotation speed of the motor 50 can also be controlled by means of voltage partitioning techniques, for example by means of variable resistance load elements, for example a potentiometer connected in series to the motor.

The variable resistance elements, for example, can be commanded on the basis of the data stored, in relation to the trajectory and torque required, or modified as a function of the application in which the motor 50 is used.

Embodiments described here with reference to FIG. 6 also concern a machine 70 for preparing coffee beverages comprising a mobile infusion unit 71 provided with an infusion chamber 73 into which coffee powder 80 is introduced, a tank 74 for water, a heating device 76, water feed means 75, for example a pump, to feed the water from the tank 74 to the infusion unit 71 and a dispenser 78 connected to the infusion chamber 73. The machine 70 can also comprise a device 77 for feeding coffee beans and/or powder, possibly associated with a grinding device (not shown).

The machine 70 according to the invention also comprises a motor 50 connected to the mobile infusion unit 71 and/or to a piston 72 defining the infusion chamber 73 and a control circuit 10 according to the invention, which is configured to control the motor 50. According to some embodiments, in this specific case, the control and command unit 13 can correspond to a control unit of the machine 70 itself, or be an independent unit connected to it.

According to some embodiments, the machine 70 also comprises a user interface 79 by means of which a user can select a beverage to be prepared and/or start its preparation and the control and command unit 13 can control the motor 50 also as a function of the command received from the user interface 79.

Some embodiments described here also concern a method to control a direct current motor 50.

The method according to the invention can be used in particular to control the movement of the infusion unit 71 of a machine 70 for preparing coffee beverages.

The control method according to the invention provides to power the motor 50 by means of the positive half-waves Vin1 of an alternating supply voltage Vin to rotate it in one sense, and by means of the negative half-waves Vin2 to rotate it in the opposite sense.

According to the invention, the method provides to connect the motor 50 to the supply voltage Vin by means of a power supply circuit 14 provided with a switch device 11 which can be selectively activated to allow the passage of an electric current from a power supply grid 60 to the motor 50.

According to some embodiments, the method provides to detect the instant of the zero-crossing of the supply voltage Vin and to selectively activate the switch device 11 with a determinate delay time with respect to the instant of the zero-crossing detected.

In particular, the method provides to delay the activation of the switch device 11 so that the commutation takes place only when the current Im that the latter can supply to the motor 50, or load, is near zero, or in any case in the half-wave corresponding to the desired sense of rotation.

Once it has received a command signal ST1, ST2, the switch device 11 will continue to conduct until the end of the current half-wave, and then remain deactivated at the subsequent half-period in the opposite sense.

According to some embodiments, the method also provides to determine in which sense the motor 50 has to be rotated, whether clockwise or counterclockwise, to detect the zero-crossing of the supply voltage correlated to the sense of rotation determined, and to send the command of activation of the switch device 11 after the determined delay time Td1, Td2 with respect to the start of the half-wave considered.

According to possible variants, the method can provide to monitor the phase shift between the supply voltage Vin and the current Im supplied to the motor, and to vary the delay time Td1, Td2 also on the basis of the phase shift detected on each occasion.

According to some embodiments, the method provides to detect the rotation speed of the motor 50 and to vary the delay time Td1, Td2 between the instant of the zero-crossing and the sending of the command signal St1, St2 in relation to the rotation speed detected.

According to some embodiments, the method provides to vary the delay time Td1, Td2 in a manner proportional to the rotation speed of the motor 50, and therefore inversely proportional to the torque required.

According to some embodiments, the method can provide to detect the rotation speed of the motor 50 by means of the rotation sensor 19.

According to some embodiments, when the speed of the motor 50 is minimum, the delay time Td1, Td2 can be substantially zero. In this case, in fact, the motor 50 behaves like a substantially resistive load, and the phase shift between the supply voltage Vin and the current Im is minimal and negligible.

As the rotation speed of the motor gradually increases, the method according to the invention provides to increase the delay time Td1, Td2 up to a maximum value, for example equal to about half the duration of a half-period. FIG. 2*d*, by way of example, shows a delay time Td1 of gradually increasing values, from a value Td1' to a value Td1''', which then remains constant at the value Td1'''. According to possible solutions, in the case of a power supply grid 60 of 230 Vdc and frequency of 50 Hz, the delay time Td1, Td2 can vary between 0 ms and 5 ms.

For example, the delay time can assume the maximum value when the maximum rated speed of the motor 50 is reached, for example comprised between 6000 and 6500 revolutions per minute (rpm).

For example, when the mobile member associated with the motor 50 is in correspondence with an end of travel position, that is, the motor 50 is stationary, the method can provide to activate the switch device 11 in correspondence with the instant of the zero-crossing detected, gradually increasing the delay time Td1, Td2 as the mobile member advances in one direction, and possibly gradually reducing it toward a second end of travel position. When the second end of travel position is reached, the delay time Td1, Td2 can go back to being near zero.

According to some embodiments, the delay time can be varied differently according to the pattern of the movement of the mobile member associated with the motor 50, in particular the infusion unit 71 (for example from bottom to top, or from top to bottom). In other words, it can be provided that, as a function of the sense of rotation of the motor 50, it is possible to define different values of the angular coefficient of a straight line resulting between the delay time and the speed of the motor 50, that is, the number of revolutions per minute (rpm).

According to some embodiments, the method can provide to calculate the delay time Td between the zero-crossing of the supply voltage Vin and the activation of the switch device 11 by means of a calculation algorithm.

The method can provide that the calculation algorithm as above is executed by a control and command unit 13, or by a processing unit 17, for example on the basis of the data present in a memory unit 16.

According to some embodiments, the method provides to determine the sense of rotation, and therefore the half-waves to be considered, and the delay time Td1, Td2 for the activation of the switch device 11 on the basis of a mathematical model of the motor 50 and/or of its functioning mode, which is correlated to a trajectory or to an operating mode of the mobile member associated with it.

For example, in the case of a motor 50 associated with the infusion unit 71 of an automatic machine 70 for preparing coffee, it is possible to model the trajectory followed by the infusion unit 71 and/or by the mobile piston 72 from the inactive position to the infusion position, and from the infusion position to the discharging and inactive position, and each trajectory can be associated with a determinate sense of rotation of the motor 50, for example anticlockwise during the ascent, and clockwise during the descent.

Advantageously, the control and command unit 13 can be configured to command the switch device 11 on the basis of the data stored in the memory unit 16 and on the basis of a beverage preparation command received by means of the user interface 79.

The control and command unit 13 can be configured to selectively activate the switch device 11 during the respective positive or negative half-waves based on the movement required.

According to some embodiments, when starting the motor 50 the method provides in particular to:
  determine the sense of rotation to be imparted to the motor 50;
  detect the zero-crossing on the supply voltage Vin in relation to the positive or negative half-wave correlated to the sense determined;
  send the command signal ST1, ST2 to the switch device 11 in correspondence with the instant of the zero-crossing detected.

The method can provide to supply a plurality of half-waves of equal sign to allow to start and rotate the motor in the desired sense.

For each half-wave, as shown by way of example in FIG. 2d, the method can provide to determine the voltage/current phase shift and suitably vary the delay time, until, in steady state, the latter can assume a constant value.

According to other embodiments, the method provides to detect the position and direction of advance and/or rotation of the mobile member, for example the infusion unit 71, by means of a plurality of encoders or position sensors 20, and to supply the activation commands to the switch device 11 as a function of the position detected.

The method can provide to monitor the position of the mobile member associated with the motor 50, for example the infusion unit 71, or a rotation time in one sense, and suspend the sending of the activation command signal to stop the motor 50.

It can also be provided to supply to the motor 50 some half-waves of opposite sign before the mobile member associated with the motor 50, for example the infusion unit 71, reaches an end of travel position, or a determinate position, in such a way as to slow down the rotation of the motor and allow a better and more precise positioning of the mobile member.

According to other embodiments, the method can provide, when an end of travel position, or a defined position of a determinate trajectory is reached by the mobile member, for example the infusion unit 71, to feed to the motor 50 some half-waves of opposite sign to those previously supplied, sufficient to reverse the sense of rotation, so as to recover possible mechanical clearances and orient it in the correct sense for the subsequent movement. In this way, it is possible to increase the positioning accuracy of the elements moved by the motor 50 and reduce noise and vibrations, since it is possible to recover the mechanical clearances by means of an inversion of the sense of rotation and then a fine-tuning around the positioning point.

According to other embodiments, the method can provide to vary the rotation speed of the motor 50 varying the supply voltage available to the motor 50 by adjusting one or more variable resistors, or potentiometers, commanded by means of the control and command unit 13.

By way of example, with reference to FIGS. 4a-d and 5a-d, these show the comparison between a control of a motor without the control circuit 10 of the present invention (FIGS. 4a-d) and with such circuit 10 (FIGS. 5a-d), for activating the rotation of the motor 50 on the positive half-wave Vin1 of the power supply.

Figure 4A:
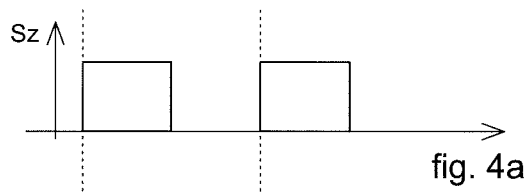
FIGS. 4a, 4b, 4c, 4d are a detailed representation of supply voltages and currents and of control signals of a motor according to the state of the art.
Figure 5A:
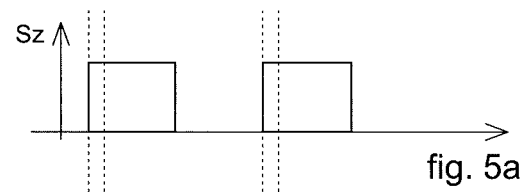
FIGS. 5a, 5b, 5c, 5d are a detailed representation of supply voltages and currents and of the control signals according to some embodiments described here.

FIGS. 4a and 5a show the trend over time of the zero-crossing detection signal Sz at output from the detection device 12.

Figure 4B:
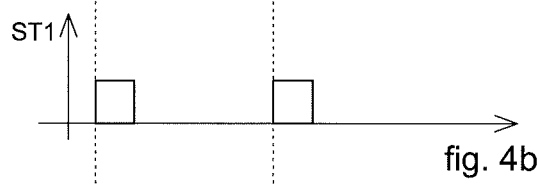
Figure 5B:
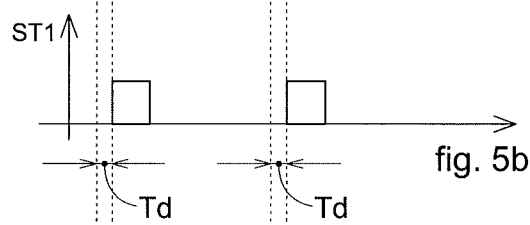

FIGS. 4b and 5b show the trend over time of the command signal ST1 of the switch device 11. In FIG. 4b the command signal ST1 is synchronous with the zero-crossing, while in FIG. 5b the command signal ST1 is delayed by the delay time Td with respect to the zero-crossing, as provided by the control method according to the invention.

Figure 4C:
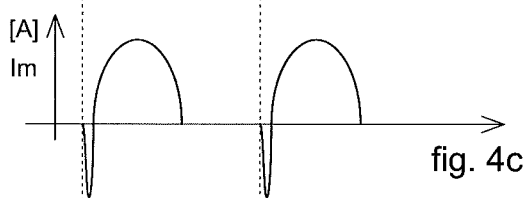
Figure 5C:
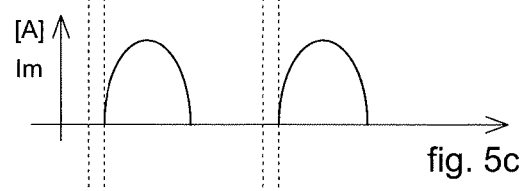

FIGS. 4c and 5c show the trend over time of the supply current Im at output from the switch device 11 toward the motor 50. As can be seen, in the case in which the switch device 11 is activated always in correspondence with the zero-crossing of the voltage, current spikes can occur on the motor Im (FIG. 4c), while it is evident that, thanks to the method and to the circuit 10 according to the invention, the current Im supplied to the motor 50 (FIG. 5c) is commutated in correspondence with its zero value.

Figure 4D:
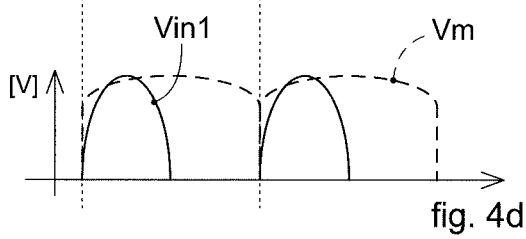
Figure 5D:
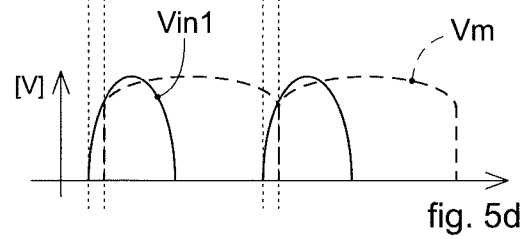

FIGS. 4d and 5d show the trend over time of the positive half-wave Vin1 of the supply voltage Vin and of the voltage Vm applied to the motor 50. It is possible to observe that, according to the invention, the voltage Vm applied to the motor 50 (FIG. 5d) remains substantially constant within a period of the voltage sine wave, thanks to the effect given by the motor 50 set in rotation.

In FIG. 4d it is also possible to observe that, the instant the command signal ST1 commutates allowing the application of the supply voltage Vin1, the voltage Vm applied to the motor 50 is higher than the supply voltage Vin1. This voltage difference is the cause of the generation of the negative current spike on the motor Im. With the control method and circuit 10 according to the invention, as can be seen in FIG. 5*d*, at the instant of commutation of ST1, the voltage Vm applied to the motor 50 and the supply voltage Vin1 have a similar value, so there are no current spikes Im.

It is clear that modifications and/or additions of parts or steps may be made to the control method and circuit 10 for a direct current motor as described heretofore, without departing from the field and scope of the present invention as defined by the claims.

The invention claimed is:

1. A machine (70) for preparing coffee beverages comprising an infusion unit (71) provided with an infusion chamber (73), a direct current motor (50) connected to said infusion unit (71) and with a control circuit (10) for said motor (50), wherein said control circuit (10) comprises:
 a power supply circuit (14) which connects said motor (50) to an electric power supply grid (60) configured to supply an alternating supply voltage (Vin);
 a detection device (12) for detecting the instant of the zero-crossing of said supply voltage (Vin) of the electricity grid;
 a switch device (11) connected between said electric power supply grid (60) and said motor (50), which can be selectively activated to allow or prevent the passage of an electric current between said electric power supply grid (60) and said motor (50);
 and a control and command unit (13) configured to selectively activate said switch device (11) to power the motor (50) by means of the positive half-waves (Vin1) of said supply voltage (Vin) to rotate it in one sense, and by means of the negative half-waves (Vin2) to rotate it in the opposite sense, wherein said control and command unit (13) is configured to receive a detection signal (Sz) of said instant of the zero-crossing of said supply voltage (Vin) and supply an activation command signal (ST1, ST2) for said switch device (11) with a delay time (Td1, Td2) with respect to said crossing instant detected, so that said switch device (11) enters into conduction when the value of the current (Im) applied to the motor (50) is near zero.

2. The machine (70) as in claim 1, wherein it comprises a memory unit (16) in which the trajectory followed by said infusion unit (71) is mapped, starting from an initial position, at least during a step of ascent to close said infusion chamber (73), during an infusion step, and during a subsequent step of opening said infusion chamber (73) and discharging the exhausted powder, and returning to the initial position, and for each position/trajectory there is associated a determinate sense of rotation, and a determinate rotation speed, or torque required for said motor (50).

3. The machine (70) as in claim 1, wherein said switch device (11) is a single TRIAC.

4. The machine (70) as in claim 1, wherein it comprises a rotation sensor (19) configured to detect the rotation speed of said motor (50) and said control and command unit (13) is configured to determine said delay time (Td1, Td2) as a function of said rotation speed detected.

5. The machine (70) as in claim 1, wherein it comprises position sensors (20) configured to detect the position of a mobile member associated with said motor (50) and which can be moved by the latter, and said control and command unit (13) is configured to calculate the delay time (Td1, Td2) to be used by means of a calculation algorithm, on the basis of the detected position and of the data stored in a memory unit (16) which comprise information relating to the sense of rotation, or of advance of said mobile member, or of a determinate operating mode of said motor member (50).

6. A method to move a mobile infusion unit (71) of a machine (70) for preparing coffee beverages provided with an infusion chamber (73), according to a predefined trajectory, from at least one initial position to at least one position for closing the chamber (73) and at least one position for discharging the exhausted coffee powder (80), wherein the infusion unit (71) comprises a direct current motor (50) powered by an alternating supply voltage (Vin), wherein said method provides to detect the instant of the zero-crossing of the supply voltage (Vin) and to selectively activate a switch device (11) to power the motor (50) by means of the positive half-waves (Vin1) of the supply voltage (Vin) in order to make it rotate in one sense between said initial position and at least said closing position, and by means of the negative half-waves (Vin2) in order to make it rotate in the opposite sense from said closing position at least toward said discharging position, wherein said method provides to activate said switch device (11) with a determinate delay time (Td1, Td2) with respect to said instant of the zero-crossing of said supply voltage (Vin) so that said switch device (11) enters into conduction at the moment in which the value of the current (Im) that powers the motor (50) is near zero.

7. The method as in claim 6, wherein it provides to determine the sense of rotation, and therefore the half-waves to be considered, and the delay time for the activation of the switch device (11) on the basis of a mathematical model of the motor (50) and/or its functioning mode, which is correlated to a trajectory or an operating mode of said infusion unit (71) associated therewith, wherein said trajectory is mapped in a memory unit (16) and said operating mode is determined by a command received by means of a user interface (79).

8. The method as in claim 7, wherein when at least one end of travel position is reached between said initial position, closing position and discharging position of said infusion unit (71), it provides to feed to the motor (50) some half-waves of opposite sign to those previously supplied, so as to recover possible mechanical clearances and orient it in the correct sense for the subsequent movement.

9. The method as in claim 6, wherein it provides to determine the phase delay that exists between the supply voltage (Vin) and the current (Im) supplied to the motor (50), and to delay the activation of said switch device (11), by a delay time (Td1, Td2) correlated to said phase delay determined.

10. The method as in claim 6, wherein it provides to detect the rotation speed of the motor (50) and to vary said delay time (Td1, Td2) in relation to the rotation speed detected.

11. The method as in claim 6, wherein it provides to determine the sense of rotation, and therefore the half-waves to be considered, and the delay time for the activation of the switch device (11) on the basis of a mathematical model of the motor (50) and/or of its functioning mode, correlated to a trajectory or to an operating mode of a mobile member associated with it.

12. The method as in claim 11, wherein it provides to detect the position and the direction of advance and/or rotation of the infusion unit (71) by means of a plurality of encoders or position sensors (20), and to supply, on each occasion, the activation command to the switch device (11) with a respective delay time (Td1, Td2) as a function of the position detected.

\* \* \* \* \*